United States Patent [19]

Goldman et al.

[11] 4,272,672
[45] Jun. 9, 1981

[54] AQUARIUM HEATER

[75] Inventors: Marvin A. Goldman, Great Neck; Jerome N. Goldman, New York; Silvio J. DiMarchi, Brooklyn, all of N.Y.

[73] Assignee: Penn-Plax Plastics, Inc., Garden City, N.Y.

[21] Appl. No.: 40,416

[22] Filed: May 18, 1979

Related U.S. Application Data

[63] Continuation of Ser. No. 837,618, Sep. 28, 1977, abandoned, which is a continuation of Ser. No. 728,203, Sep. 30, 1976, abandoned.

[51] Int. Cl.³ ............................................. H05B 3/06
[52] U.S. Cl. ........................................ 219/523; 119/5; 219/331; 219/336; 219/536; 219/442
[58] Field of Search ............... 219/328, 331, 332, 336, 219/337, 386, 415, 437, 517, 442, 523, 534, 536, 537; 119/5

[56] References Cited

U.S. PATENT DOCUMENTS

| | | | |
|---|---|---|---|
| 2,699,488 | 1/1955 | Arak et al. | 219/328 |
| 2,811,629 | 10/1957 | Danner | 219/523 |
| 2,839,660 | 6/1958 | Davies | 219/534 |
| 3,107,289 | 10/1963 | Willinger | 219/523 X |
| 3,107,290 | 10/1963 | Willinger | 219/523 X |
| 3,564,589 | 2/1971 | Arak | 219/331 |
| 3,619,565 | 11/1971 | D'Elia et al. | 219/523 |
| 3,895,217 | 7/1975 | Hall et al. | 219/523 |
| 4,021,643 | 5/1977 | Hall et al. | 219/523 |
| 4,072,847 | 2/1978 | Craven | 219/523 |
| 4,107,514 | 8/1978 | Ellson | 219/523 |

*Primary Examiner*—Volodymyr Y. Mayewsky
*Attorney, Agent, or Firm*—Mandeville and Schweitzer

[57] ABSTRACT

An immersible, floatable aquarium heater is provided, with universal mounting bracket which will accommodate both the old and new types of aquarium construction. The heater includes a sealing cap incorporating integrally the control knob spindle and the power line for the heater. The arrangement provides a triple seal to protect the vital heater controls from high humidity in the aquarium environment, with the seal preventing leakage in case of accidental submersion of the entire heater. The control knob of the heater includes a tamper-proof feature to avoid adjustments beyond a 10° range, unless actually required.

5 Claims, 3 Drawing Figures

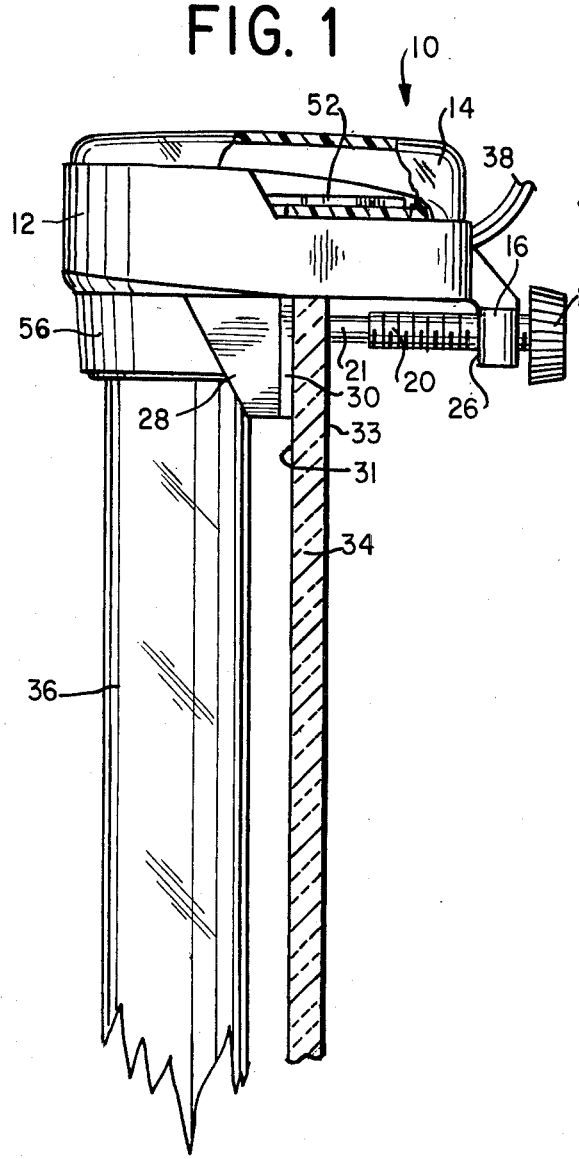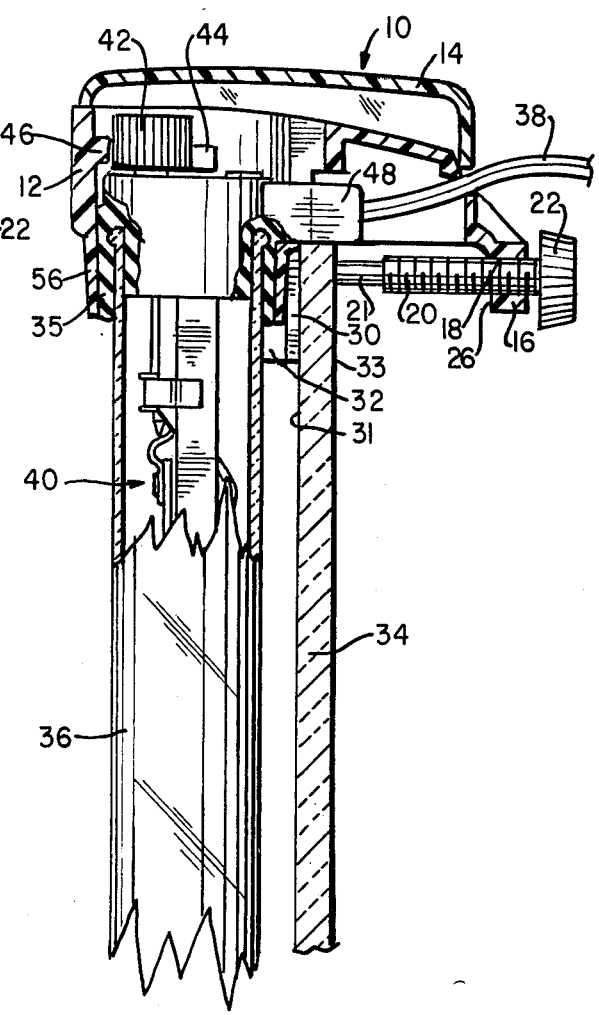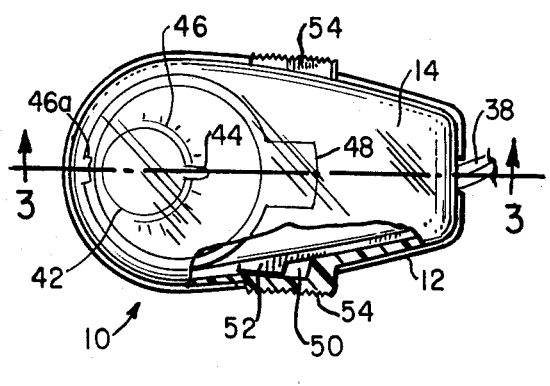

4,272,672

AQUARIUM HEATER

This is a continuation of application Ser. No. 837,618, filed Sept. 28, 1977, now abandoned which in turn is a continuation of application Ser. No. 728,203, filed Sept. 30, 1976, now abandoned.

BACKGROUND AND STATEMENT OF THE INVENTION

Aquariums have become increasingly popular as a hobby in recent years, and as individuals become more interested in their hobby, they begin to acquire more expensive and exotic fish for the aquarium. Particularly with respect to many forms of tropical fish, which are attractive when displayed in an aquarium, the fish require heated water in order to simulate the natural environment which they are used to. Moreover, such exotic fish are extremely sensitive to temperature variations and will succumb to fluctuation in temperature of as little as 15° to 20° either above or below their required temperature. As will be appreciated, therefore, many developments have been made in aquarium heaters in order to provide the proper temperature maintenance of the aquarium tank.

One of the difficulties with aquarium heaters is that they sometimes fail at times when the aquarium is not being observed or when the owner happens to be away from home for a period of time. As will be appreciated, even failure for several hours will cause a change in temperature which may destroy an entire tank of expensive tropical fish. Such failures include failure of the metallic parts for controlling the electrical connections to the heater submersed in the tank. As will be appreciated, the areas around aquarium tanks are high in humidity and this high humidity causes oxidation of such metallic parts. In addition, since aquarium heaters are operated by electricity, unless they are properly sealed, accidental dropping of the entire heater including the supporting structure and the control components can cause short circuiting, which is dangerous, not only for the operator of an aquarium, but also for the fish.

Another problem with the control of the temperature in aquariums is the tampering of the heater controls by children or others not knowledgeable in the use of the heater and the problems involved with substantial fluctuations in temperature. That is, a child may move the control knob to a degree causing the heater to raise the temperature of the tank to a level which might cause the destruction of some or all of the fish contained in the tank.

With this invention, by contrast, an aquarium heater is provided with an integral heater control unit connected to and incorporating a sealing cap which provides a moisture barrier seal between the control unit and the glass tube containing the heater element and the connections therefor to the control unit. The sealing cap includes an integral flexible extension surrounding the power cord for the heater and includes the control knob spindle for the heater. The sealing cap is so constructed to engage both the internal and external surfaces of the top of the glass tube of the heater, so as to prevent exposure to moisture for all of the controls and connections of the heater and the heater element.

Combined with the integral sealing cap is a mounting unit which is constructed to surround and form with the sealing cap structure, an assembly which will accommodate the mounting of the heater of the invention universally on any dimension of aquarium wall, including the old type aquarium incorporating a metallic frame and the new type which utilizes only glass walls. Thus, the mounting arrangement of the invention will accommodate a variety of dimensions of aquarium wall. Also, the mounting unit provides an additional seal and cover for the control knob and spindle to protect against the prevailing humidity.

The heater includes a tamper-proof control dial, which is arranged to vary the temperature of the heater only 10° F. in any 180° turn. At that point, the knob engages a stop so that a child turning the knob, for example, can only vary the temperature in the tank 10°. If it is desired to increase the temperature beyond the 10° range of the control knob, it merely has to be lifted from its spindle so that it will pass the stop and be movable to increase or decrease the temperature, as the case may be, an additional 10° for the next 180° turn of the knob.

Other ojects and advantages of the invention will be apparent from the following description, the accompanying drawings, and the appended claims.

DETAILED DESCRIPTION OF THE DRAWINGS

FIG. 1 is a side elevational view of the top portion of the aquarium heater of the invention, shown engaging the top edge of an aquarium wall, with a portion broken away;

FIG. 2 is a top plan view of the aquarium heater of FIG. 1; and

FIG. 3 is a cross sectional view taken along lines 3—3 of FIG. 2.

DETAILED DESCRIPTION OF THE INVENTION

Referring to the drawings in which like reference numbers refer to like parts throughout the several views thereof, an aquarium heater generally designated 10 is shown with a hanger mounting unit 12, surrounding a sealing cap 35, engaging the top of the heater tube 36. As can be seen in FIGS. 1 and 3, the heater 10 engages the top edge of an aquarium wall 34. To this end, hanger mounting unit 12 includes an extension 16 at one end thereof. Extension 16 includes a threaded bore 18 for receiving the threads 20 of an adjusting screw 22. On each side of mounting unit 12 is a depending bracket 28, which holds a resilient bumper 30. The bumpers on each side of the hanger mounting unit 12 engage the inner surface 31 of wall 34. Thus, adjustment of mounting screw 22 causes the inner end 21 thereof to engage the outer surface 33 of wall 34, causing the wall to be held between bumpers 30 and the adjusting screw portion 21 to hold the heater 10 firmly on the top edge of the aquarium wall.

As can be seen in FIGS. 1 and 3, the space between the engaging surfaces 32 of bumpers 30 and the opposing wall 26 of extensions 16 is such as to allow for aquarium walls of substantially greater thickness than the conventional glass walled aquariums now used. Thus, the adjusting screw for mounting the unit, in accordance herewith, is universal in that it will accommodate the thick walled frames of older aquarium units. Mounting unit 12 includes a moisture protective safety cap 14, which is, preferably, transparent, so that the control knob 42 is visible to check the setting thereof without removal of the protective cap 14.

Referring to FIGS. 2 and 3, the heater includes a control knob 42, with an indicator pointer 44 for indicating the setting on dial 46. One of the features of the invention includes an abutment or stop 46a, which is engaged by the pointer 44 after a 180° adjustment of knob 42 in either direction. The controls of the heater are so arranged that this 180° movement provides only a 10° F. increase or decrease (depending upon which direction the knob is turned) in temperature. If a larger change in temperature is required, the knob 42 is removable from its spindle so that the pointer 44 may be moved past stop 46 for an additional 10° increase or decrease in temperature, as required. By having the abutment feature, those who may move the control knob, without understanding what may happen if the temperature were increased or decreased to too large a degree, can only adjust the temperature up or down 10°.

Referring to FIGS. 1 and 2, protective cap 14 and unit 12 include cooperating grooves and abutments 50, 52 for sliding locking engagement thereof, to maintain cap 14 on unit 12. In addition, cap 14 includes roughened finger holds 54 on either side thereof to facilitate removal of cap 14 from unit 12.

As can be seen in FIG. 3, resilient sealing cap or gasket 35 engages the top edge of glass tube 36 and extends internally thereof down into and engages the internal surfaces of tube 36. Moreover, gasket 35 extends down along the outer surface of tube 36, as well. Thus, the electrical components 40 of heater 10 which extend from gasket 35 are entirely segregated and protected from the humid environment of the aquarium. Integral with the gasket 35 is a radial extension 48 which surrounds and seals the connection between the controls 40 and the power cord 38 for the heater 10. In addition, the sealing gasket or cap 35 incorporates the control spindle for control knob 42. Thus, all of the electrical connections and components for the heater are incorporated into one integral unit extending from sealing gasket 35 to provide a total dual moisture seal between the internal area of tube 36 and the moisture in the air around the aquarium. Indeed, the sealing arrangement is such, that if the entire assembly is accidentally dropped into the aquarium, a total seal between the control unit 40 and the water is maintained. The unit, will, in fact, float on the surface of the water contained in the aquarium.

As a further sealing feature of the invention here, mounting unit 12 includes an integral depending portion or skirt 56 which extends entirely around and engages the outer surface of sealing gasket or cap 35. Thus, with the protective cap 14 in place, the whole upper portion including the control knob is protected, also from the humidity surrounding the unit. The unit is, therefore, provided with a triple seal between the internal portions of tube 36 and the surrounding environment.

As will be apparent from the foregoing, an aquarium heater is provided with a resilient sealing cap arrangement, which incorporates the spindle for the control knob therefor, as well as the operating parts of the heater and the power connection in a single integral component which engages the top edge of the heater tube. The sealing cap extends into the heater tube along the internal surface thereof, and also along the outer surface for a portion of the extent of the tube from the top to maintain a dual seal between the internal parts of the tube and the surrounding environment. Moreover, the sealing cap includes cooperating means for sealing engagement with the mounting structure of the aquarium heater, in accordance herewith, to protect the exposed control components of the heater from the surrounding humid environment. Thus, a sealing feature is provided with this invention which is so effective that the heater of the invention will float and will prevent moisture from entering the electrical operating components of the heater, even if the heater is accidentally dropped in the aquarium tank. In addition, the heater of the invention includes a universal mounting unit for engaging the top walls of aquariums of a variety of different thickness. The control knob of the heater is so arranged that it is essentially tamper-proof, thus foiling any unwanted fluctuations in temperature in the tank controlled by the heater of the invention which might seriously damage or destroy the fish in the aquarium being so controlled.

While the forms of apparatus herein described constitute preferred embodiments of the invention, it is to be understood that the invention is not limited to these precise forms of apparatus, and changes may be made therein without departing from the scope of the invention, which is defined in the appended claims. For example, although the sealing gasket 35 and mounting assembly 12 are shown as separate units, it will be appreciated that they could be combined as a single integral unit.

We claim:

1. An aquarium heater for mounting on the top of an aquarium wall, and having an exposed thermostatic control, comprising
   (a) a glass tube body closed at one end;
   (b) an electrical heater element in said body;
   (c) a thermostatic control connected to said heater element and extending from the top of said tube body;
   (d) an electric power line for said heater element extending from the top of said tube body; the improvement characterized by
   (e) a unitary dielectric sealing cap for said body disposed on the end of said tube opposite said closed end and sealingly engaging said thermostatic control;
   (f) said sealing cap extending part-way into said body;
   (g) an integral sealing skirt on said sealing cap and coaxial therewith, said sealing skirt extending partly along the outside of said tube body walls from the open end thereof;
   (h) an integral radial extension on said sealing cap, said radial extension surrounding and sealing said power line;
   (i) a hanger mounting unit coaxial with said sealing cap;
   (j) an integral depending extension on said hanger mounting unit extending from one side edge thereof, said extension having a threaded bore therein;
   (k) an adjusting screw in said threaded bore for engaging the outer surface of an aquarium wall;
   (l) a pair of spaced integral brackets depending from said hanger mounting unit and spaced from said adjusting screw for engaging the inner surface of said aquarium wall; and
   (m) a control knob engaging said thermostatic control.

2. The apparatus of claim 1, further characterized by
   (a) said control knob including a radially extending finger;
   (b) stop means for engaging said finger; and (c) said thermostatic control arranged to adjust said electrical control a limited amount for each 180° turn thereof.

3. The apparatus of claim 1, further characterized by
(a) a protective cap for protecting said control knob; and
(b) cooperating abutment means on said cap and said mounting means for holding said cap in place.

4. The apparatus of claim 1, further characterized by
(a) rubber bumpers on each of said pair of brackets.

5. The apparatus of claim 1, further characterized by
(a) a radial opening in said integral depending extension on said hanger mounting unit; and
(b) said integral radial extension on said sealing cap extending through said radial opening.

* * * * *